(12) United States Patent
Kweon et al.

(10) Patent No.: US 7,351,127 B2
(45) Date of Patent: Apr. 1, 2008

(54) LIQUID CRYSTAL DISPENSING APPARATUS

(75) Inventors: Hyug-Jin Kweon, Kyoungsangbuk-Do (KR); Hae-Joon Son, Pusan (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/896,953

(22) Filed: Jul. 23, 2004

(65) Prior Publication Data
US 2004/0259457 A1    Dec. 23, 2004

Related U.S. Application Data

(63) Continuation of application No. 10/184,116, filed on Jun. 28, 2002, now Pat. No. 6,811,459.

(30) Foreign Application Priority Data
Mar. 15, 2002    (KR) .......................... 10-2002-14203

(51) Int. Cl.
*H01J 9/06* (2006.01)
*B65D 47/00* (2006.01)

(52) U.S. Cl. ..................... 445/66; 445/60; 445/73; 222/501; 222/502; 222/518; 251/66

(58) Field of Classification Search ............. 222/504, 222/518, 501, 502; 118/300, 400, 40; 427/256, 427/421; 445/24, 25, 60, 66; 251/65, 66; 141/4, 31, 192
See application file for complete search history.

(56) References Cited

U.S. PATENT DOCUMENTS

| | | | |
|---|---|---|---|
| 3,485,417 A * | 12/1969 | Cocks ........................ 222/504 |
| 3,730,133 A * | 5/1973 | Cordiano et al. ........... 118/685 |
| 3,827,604 A * | 8/1974 | Hamilton et al. ......... 222/146.5 |
| 3,978,580 A | 9/1976 | Leupp et al. |
| 4,094,058 A | 6/1978 | Yasutake et al. |
| 4,653,864 A | 3/1987 | Baron et al. |
| 4,691,995 A | 9/1987 | Yamazaki et al. |
| 4,775,225 A | 10/1988 | Tsuboyama et al. |
| 5,074,443 A * | 12/1991 | Fujii et al. ................... 222/639 |
| 5,247,377 A | 9/1993 | Omeis et al. |
| 5,263,888 A | 11/1993 | Ishihara et al. |
| 5,379,139 A | 1/1995 | Sato et al. |
| 5,406,989 A | 4/1995 | Abe |
| 5,499,128 A | 3/1996 | Hasegawa et al. |
| 5,507,323 A | 4/1996 | Abe |
| 5,511,591 A | 4/1996 | Abe |
| 5,539,545 A | 7/1996 | Shimizu et al. |
| 5,548,429 A | 8/1996 | Tsujita |
| 5,598,973 A * | 2/1997 | Weston ......................... 239/75 |
| 5,642,214 A | 6/1997 | Ishii et al. |
| 5,680,189 A | 10/1997 | Shimizu et al. |

(Continued)

FOREIGN PATENT DOCUMENTS

EP    1 003 066 A1    5/2000

(Continued)

*Primary Examiner*—Mariceli Santiago
(74) *Attorney, Agent, or Firm*—Mckenna Long & Aldridge LLP

(57) ABSTRACT

A liquid crystal dispensing apparatus having a multipart, separable needle that can be easily repaired should the needle becomes distorted or damaged.

20 Claims, 7 Drawing Sheets

U.S. PATENT DOCUMENTS

| | | | |
|---|---|---|---|
| 5,742,370 A | 4/1998 | Kim et al. | |
| 5,757,451 A | 5/1998 | Miyazaki et al. | |
| 5,785,246 A * | 7/1998 | King et al. | 239/11 |
| 5,852,484 A | 12/1998 | Inoue et al. | |
| 5,854,664 A | 12/1998 | Inoue et al. | |
| 5,861,932 A | 1/1999 | Inata et al. | |
| 5,875,922 A | 3/1999 | Chastine et al. | |
| 5,952,676 A | 9/1999 | Sato et al. | |
| 5,952,678 A | 9/1999 | Ashida | |
| 5,956,112 A | 9/1999 | Fujimori et al. | |
| 6,001,203 A | 12/1999 | Yamada et al. | |
| 6,011,609 A | 1/2000 | Kato et al. | |
| 6,016,178 A | 1/2000 | Kataoka et al. | |
| 6,016,181 A | 1/2000 | Shimada | |
| 6,055,035 A | 4/2000 | von Gutfeld et al. | |
| 6,161,722 A * | 12/2000 | Sooudi et al. | 222/1 |
| 6,163,357 A | 12/2000 | Nakamura | |
| 6,219,126 B1 | 4/2001 | Von Gutfeld | |
| 6,226,067 B1 | 5/2001 | Nishiguchi et al. | |
| 6,236,445 B1 | 5/2001 | Foschaar et al. | |
| 6,250,515 B1 * | 6/2001 | Newbold et al. | 222/504 |
| 6,253,957 B1 * | 7/2001 | Messerly et al. | 222/1 |
| 6,257,445 B1 * | 7/2001 | Means et al. | 222/504 |
| 6,304,306 B1 | 10/2001 | Shiomi et al. | |
| 6,304,311 B1 | 10/2001 | Egami et al. | |
| 6,337,730 B1 | 1/2002 | Ozaki et al. | |
| 6,414,733 B1 | 7/2002 | Ishikawa et al. | |
| 6,610,364 B1 * | 8/2003 | Kweon et al. | 427/256 |
| 6,811,459 B2 * | 11/2004 | Kweon et al. | 445/66 |
| 2001/0021000 A1 | 9/2001 | Egami | |

FOREIGN PATENT DOCUMENTS

| | | |
|---|---|---|
| EP | 1003066 A1 | 5/2000 |
| JP | 51-65656 | 6/1976 |
| JP | 57-038414 | 3/1982 |
| JP | 57038414 | 3/1982 |
| JP | 57-088428 | 6/1982 |
| JP | 57088428 | 6/1982 |
| JP | 58-027126 | 2/1983 |
| JP | 58027126 | 2/1983 |
| JP | 59-057221 | 4/1984 |
| JP | 59-195222 | 11/1984 |
| JP | 60-111221 | 6/1985 |
| JP | 60-164723 | 8/1985 |
| JP | 60164723 | 8/1985 |
| JP | 60-217343 | 10/1985 |
| JP | 60217343 | 10/1985 |
| JP | 61-007822 | 1/1986 |
| JP | 61007822 | 1/1986 |
| JP | 61-055625 | 3/1986 |
| JP | 61055625 | 3/1986 |
| JP | S62-054225 | 3/1987 |
| JP | S62-054228 | 3/1987 |
| JP | S62-054229 | 3/1987 |
| JP | 62-089025 | 4/1987 |
| JP | 62-090622 | 4/1987 |
| JP | 62089025 | 4/1987 |
| JP | 62090622 | 4/1987 |
| JP | 62-205319 | 9/1987 |
| JP | 62205319 | 9/1987 |
| JP | 63-109413 | 5/1988 |
| JP | 63-110425 | 5/1988 |
| JP | 63-128315 | 5/1988 |
| JP | 63109413 | 5/1988 |
| JP | 63110425 | 5/1988 |
| JP | 63128315 | 5/1988 |
| JP | 63-311233 | 12/1988 |
| JP | 63311233 | 12/1988 |
| JP | H03-009549 | 1/1991 |
| JP | H05-036425 | 2/1993 |
| JP | H05-036426 | 2/1993 |
| JP | H05-107533 | 4/1993 |
| JP | 05-127179 | 5/1993 |
| JP | 05127179 | 5/1993 |
| JP | 05-154923 | 6/1993 |
| JP | 5154923 | 6/1993 |
| JP | 05-265011 | 10/1993 |
| JP | 05-281557 | 10/1993 |
| JP | 05-281562 | 10/1993 |
| JP | 05265011 | 10/1993 |
| JP | 05281557 | 10/1993 |
| JP | 05281562 | 10/1993 |
| JP | H06-018829 | 1/1994 |
| JP | 06-051256 | 2/1994 |
| JP | 06051256 | 2/1994 |
| JP | H06-064229 | 3/1994 |
| JP | 06-148657 | 5/1994 |
| JP | 06148657 | 5/1994 |
| JP | 06-160871 | 6/1994 |
| JP | 6160871 | 6/1994 |
| JP | H06-194637 | 7/1994 |
| JP | 06-235925 | 8/1994 |
| JP | 6235925 | 8/1994 |
| JP | 06-265915 | 9/1994 |
| JP | 06265915 | 9/1994 |
| JP | 06-313870 | 11/1994 |
| JP | 6313870 | 11/1994 |
| JP | 07-084268 | 3/1995 |
| JP | 7084268 | 3/1995 |
| JP | 07-128674 | 5/1995 |
| JP | 07128674 | 5/1995 |
| JP | 07-181507 | 7/1995 |
| JP | 07181507 | 7/1995 |
| JP | H07-275770 | 10/1995 |
| JP | H07-275771 | 10/1995 |
| JP | H08-076133 | 3/1996 |
| JP | 08-095066 | 4/1996 |
| JP | 08-101395 | 4/1996 |
| JP | 08-106101 | 4/1996 |
| JP | 08095066 | 4/1996 |
| JP | 8101395 | 4/1996 |
| JP | 08106101 | 4/1996 |
| JP | H08-110504 | 4/1996 |
| JP | H08-136937 | 5/1996 |
| JP | 08-171094 | 7/1996 |
| JP | 08-190099 | 7/1996 |
| JP | 08171094 | 7/1996 |
| JP | 08190099 | 7/1996 |
| JP | H08-173874 | 7/1996 |
| JP | 08-240807 | 9/1996 |
| JP | 08240807 | 9/1996 |
| JP | 09-005762 | 1/1997 |
| JP | 09-026578 | 1/1997 |
| JP | 09005762 | 1/1997 |
| JP | 09026578 | 1/1997 |
| JP | H09-001026 | 1/1997 |
| JP | 09-311340 | 2/1997 |
| JP | 09-61829 | 3/1997 |
| JP | 09-073075 | 3/1997 |
| JP | 09-073096 | 3/1997 |
| JP | 9061829 | 3/1997 |
| JP | 09073075 | 3/1997 |
| JP | 09073096 | 3/1997 |
| JP | H09-094500 | 4/1997 |
| JP | 09-127528 | 5/1997 |
| JP | 09127528 | 5/1997 |
| JP | 09-230357 | 9/1997 |
| JP | 09230357 | 9/1997 |
| JP | 09-281511 | 10/1997 |
| JP | 09281511 | 10/1997 |
| JP | 09311340 | 12/1997 |
| JP | 10-123537 | 5/1998 |
| JP | 10-123538 | 5/1998 |

| | | | | | |
|---|---|---|---|---|---|
| JP | 10-142616 | 5/1998 | JP | 2001142074 | 5/2001 |
| JP | 10123537 | 5/1998 | JP | 2001147437 | 5/2001 |
| JP | 10123538 | 5/1998 | JP | 2001-154211 | 6/2001 |
| JP | 10142616 | 5/1998 | JP | 2001-166272 | 6/2001 |
| JP | 10-177178 | 6/1998 | JP | 2001-166310 | 6/2001 |
| JP | 10177178 | 6/1998 | JP | 2001154211 | 6/2001 |
| JP | H10-174924 | 6/1998 | JP | 2001-183683 | 7/2001 |
| JP | 10-221700 | 8/1998 | JP | 2001-201750 | 7/2001 |
| JP | 10221700 | 8/1998 | JP | 2001-209052 | 8/2001 |
| JP | 10-282512 | 10/1998 | JP | 2001-209056 | 8/2001 |
| JP | 10282512 | 10/1998 | JP | 2001-209057 | 8/2001 |
| JP | 10-333157 | 12/1998 | JP | 2001-209058 | 8/2001 |
| JP | 10-333159 | 12/1998 | JP | 2001-209060 | 8/2001 |
| JP | 10333157 | 12/1998 | JP | 2001-215459 | 8/2001 |
| JP | 10333159 | 12/1998 | JP | 2001-222017 | 8/2001 |
| JP | 11-014953 | 1/1999 | JP | 2001-235758 | 8/2001 |
| JP | 11014953 | 1/1999 | JP | 2001-215459 | 9/2001 |
| JP | 11-038424 | 2/1999 | JP | 2001-255542 | 9/2001 |
| JP | 11038424 | 2/1999 | JP | 2001-264782 | 9/2001 |
| JP | 11-064811 | 3/1999 | JP | 2001255542 | 9/2001 |
| JP | 11064811 | 3/1999 | JP | 2001264782 | 9/2001 |
| JP | 11-109388 | 4/1999 | JP | 2001-201750 | 10/2001 |
| JP | 11109388 | 4/1999 | JP | 2001-272640 | 10/2001 |
| JP | 11-133438 | 5/1999 | JP | 2001-281675 | 10/2001 |
| JP | 11-142864 | 5/1999 | JP | 2001-281678 | 10/2001 |
| JP | 11133438 | 5/1999 | JP | 2001-282126 | 10/2001 |
| JP | 11142864 | 5/1999 | JP | 2001-305563 | 10/2001 |
| JP | 11-174477 | 7/1999 | JP | 2001-330837 | 11/2001 |
| JP | 11174477 | 7/1999 | JP | 2001-330840 | 11/2001 |
| JP | 11-212045 | 8/1999 | JP | 2001330840 | 11/2001 |
| JP | 11212045 | 8/1999 | JP | 2001-356353 | 12/2001 |
| JP | 11-248930 | 9/1999 | JP | 2001-356354 | 12/2001 |
| JP | 11248930 | 9/1999 | JP | 2001356354 | 12/2001 |
| JP | H11-262712 | 9/1999 | JP | 2002-014360 | 1/2002 |
| JP | H11-264991 | 9/1999 | JP | 2002-023176 | 1/2002 |
| JP | 11-326922 | 11/1999 | JP | 2002014360 | 1/2002 |
| JP | 11326922 | 11/1999 | JP | 2002023176 | 1/2002 |
| JP | 11-344714 | 12/1999 | JP | 2002-049045 | 2/2002 |
| JP | 11344714 | 12/1999 | JP | 2002049045 | 2/2002 |
| JP | 2000-002879 | 1/2000 | JP | 2002-079160 | 3/2002 |
| JP | 2000-029035 | 1/2000 | JP | 2002-080321 | 3/2002 |
| JP | 2000029035 | 1/2000 | JP | 2002-082340 | 3/2002 |
| JP | 2000-056311 | 2/2000 | JP | 2002-090759 | 3/2002 |
| JP | 2000-066165 | 3/2000 | JP | 2002-090760 | 3/2002 |
| JP | 2000-066218 | 3/2000 | JP | 2002082340 | 3/2002 |
| JP | 2000-093866 | 4/2000 | JP | 2002090759 | 3/2002 |
| JP | 2000-137235 | 5/2000 | JP | 2002090760 | 3/2002 |
| JP | 2000-147528 | 5/2000 | JP | 2002-107740 | 4/2002 |
| JP | 3000-147528 | 5/2000 | JP | 2002-122870 | 4/2002 |
| JP | 2000-193988 | 7/2000 | JP | 2002-122872 | 4/2002 |
| JP | 2000-241824 | 9/2000 | JP | 2002-122873 | 4/2002 |
| JP | 2000-284295 | 10/2000 | JP | 2002107740 | 4/2002 |
| JP | 2000-292799 | 10/2000 | JP | 2002122872 | 4/2002 |
| JP | 2000-310759 | 11/2000 | JP | 2002122873 | 4/2002 |
| JP | 2000-310784 | 11/2000 | JP | 2002-131762 | 5/2002 |
| JP | 2000-338501 | 12/2000 | JP | 2002-139734 | 5/2002 |
| JP | 2001-005401 | 1/2001 | JP | 2002-156518 | 5/2002 |
| JP | 2001-005405 | 1/2001 | JP | 2002-169166 | 6/2002 |
| JP | 2001-013506 | 1/2001 | JP | 2002-169167 | 6/2002 |
| JP | 2001-033793 | 2/2001 | JP | 2002-182222 | 6/2002 |
| JP | 2001-042341 | 2/2001 | JP | 2002080321 | 6/2002 |
| JP | 2001-051284 | 2/2001 | JP | 2002-202512 | 7/2002 |
| JP | 2001-066615 | 3/2001 | JP | 2002-202514 | 7/2002 |
| JP | 2001-091727 | 4/2001 | JP | 2002-214626 | 7/2002 |
| JP | 2001-117105 | 4/2001 | JP | 2002202512 | 7/2002 |
| JP | 2001-117109 | 4/2001 | JP | 2002202514 | 7/2002 |
| JP | 2001117105 | 4/2001 | JP | 2002214626 | 7/2002 |
| JP | 2001-133745 | 5/2001 | JP | 2002-229042 | 8/2002 |
| JP | 2001-133794 | 5/2001 | JP | 2002-236276 | 8/2002 |
| JP | 2001-133799 | 5/2001 | JP | 2002-258299 | 8/2002 |
| JP | 2001-142074 | 5/2001 | JP | 2002-236292 | 9/2002 |
| JP | 2001-147437 | 5/2001 | JP | 2002-277865 | 9/2002 |
| JP | 2001133794 | 5/2001 | JP | 2002-277866 | 9/2002 |

| | | | | | | |
|---|---|---|---|---|---|---|
| JP | 2002-277881 | 9/2002 | | JP | 2002-341329 | 11/2002 |
| JP | 2002-287156 | 10/2002 | | JP | 2002-341355 | 11/2002 |
| JP | 2002-296605 | 10/2002 | | JP | 2002-341356 | 11/2002 |
| JP | 2002-311438 | 10/2002 | | JP | 2002-341357 | 11/2002 |
| JP | 2002-311440 | 10/2002 | | JP | 2002-341358 | 11/2002 |
| JP | 2002-311442 | 10/2002 | | JP | 2002-341359 | 11/2002 |
| JP | 2002-323687 | 11/2002 | | JP | 2002-341362 | 11/2002 |
| JP | 2002-323694 | 11/2002 | | KR | 2000-0035302 | 6/2000 |
| JP | 2002-333628 | 11/2002 | | KR | 2000-0035302 A1 | 6/2000 |
| JP | 2002-333635 | 11/2002 | | | | |
| JP | 2002-333843 | 11/2002 | | | | |

* cited by examiner

LIQUID CRYSTAL DISPENSING APPARATUS

This application is a continuation application of U.S. patent application Ser. No. 10/184,116, filed Jun. 28, 2002, now U.S. Pat. No. 6,811,459, which claims priority to Korean Patent Application No. P2002-14203, filed on Mar. 15, 2002, which is hereby incorporated by reference for all purposes as if fully set forth herein.

This application incorporates by reference two co-pending applications, Ser. No. 10/184,116, filed on Jun. 28, 2002, entitled "SYSTEM AND METHOD FOR MANUFACTURING LIQUID CRYSTAL DISPLAY DEVICES" and Ser. No. 10/184,088, filed on Jun. 28, 2002, entitled "SYSTEM FOR FABRICATING LIQUID CRYSTAL DISPLAY AND METHOD OF FABRICATING LIQUID CRYSTAL DISPLAY USING THE SAME" as if fully set forth herein.

BACKGROUND OF THE INVENTION

1. Field of the Invention

The present invention relates to a liquid crystal dispensing apparatus, and more particularly, to a liquid crystal dispensing apparatus having a multipart, separable needle that can be easily repaired.

2. Discussion of the Related Art

Portable electric devices, such as mobile phones, personal digital assistants (PDA), and notebook computers, often require thin, lightweight, and efficient flat panel displays. There are various types or flat panel displays, including liquid crystal displays (LCD), plasma display panels (PDP), field emission displays (FED), and vacuum fluorescent displays (VFD). Of these, LCDs have the advantages of being widely available, easy to use, and superior image quality.

The LCD displays information based on the refractive anisotropy of liquid crystal. As shown in FIG. 1, an LCD 1 comprises a lower substrate 5, an upper substrate 3, and a liquid crystal layer 7 that is disposed between the lower substrate 5 and the upper substrate 3. The lower substrate 5 includes an array of driving devices and a plurality of pixels (not shown). The individual driving devices are usually thin film transistors (TFT) located at each pixel. The upper substrate 3 includes color filters for producing color. Furthermore, a pixel electrode and a common electrode are respectively formed on the lower substrate 5 and on the upper substrate 3. Alignment layers are formed on the lower substrate 5 and on the upper substrate 3. The alignment layers are used to uniformly align the liquid crystal layer 7.

The lower substrate 5 and the upper substrate 3 are attached using a sealing material 9. In operation, the liquid crystal molecules are initially oriented by the alignment layers, and then reoriented by the driving device according to video information so as to control the light transmitted through the liquid crystal layer to produce an image.

The fabrication of an LCD device requires the forming of driving devices on the lower substrate 5, the forming of the color filters on the upper substrate 3, and performing a cell process (described subsequently). Those processes will be described with reference to FIG. 2.

Initially, in step S101, a plurality of perpendicularly crossing gate lines and data lines are formed on the lower substrate 5, thereby defining pixel areas between the gate and data lines. A thin film transistor that is connected to a gate line and to a data line is formed in each pixel area. Also, a pixel electrode that is connected to the thin film transistor is formed in each pixel area. This enables driving the liquid crystal layer according to signals applied through the thin film transistor.

In step S104, R (Red), G (Green), and B (Blue) color filter layers (for reproducing color) and a common electrode are formed on the upper substrate 3. Then, in steps S102 and S105, alignment layers are formed on the lower substrate 5 and on the upper substrate 3. The alignment layers are rubbed to induce surface anchoring (establishing a pretilt angle and an alignment direction) for the liquid crystal molecules. Thereafter, in step S103, spacers for maintaining a constant, uniform cell gap is dispersed onto the lower substrate 5.

Then, in steps S106 and S107, a sealing material is applied onto outer portions such that the resulting seal has a liquid crystal injection opening. That opening is used to inject liquid crystal. The upper substrate 3 and the lower substrate 5 are then attached together by compressing the sealing material.

While the foregoing has described forming a single panel area, in practice it is economically beneficial to form a plurality of unit panel areas. To this end, the lower substrate 5 and the upper substrate 3 are large glass substrates that contain a plurality of unit panel areas, each having a driving device array or a color filter array surrounded by sealant having a liquid crystal injection opening. To isolate the individual unit panels, in step S108 the assembled glass substrates are cut into individual unit panels. Thereafter, in step S109 liquid crystal is injected into the individual unit panels by way of liquid crystal injection openings, which are then sealed. Finally, in step S110 the individual unit panels are tested.

As described above, liquid crystal is injected through a liquid crystal injection opening. Injection of the liquid crystal is usually pressure induced. FIG. 3 shows a device for injecting liquid crystal. As shown, a container 12 that contains liquid crystal, and a plurality of individual unit panels 1 are placed in a vacuum chamber 10 such that the individual unit panels 1 are located above the container 12. The vacuum chamber 10 is connected to a vacuum pump that produces a predetermined vacuum. A liquid crystal display panel moving device (not shown) moves the individual unit panels 1 into contact with the liquid crystal 14 such that each injection opening 16 is in the liquid crystal 14.

When the vacuum within the chamber 10 is increased by inflowing nitrogen gas ($N_2$) the liquid crystal 14 is injected into the individual unit panels 1 through the liquid crystal injection openings 16. After the liquid crystal 14 entirely fills the individual unit panels 1, the liquid crystal injection opening 16 of each individual unit panel 1 is sealed by a sealing material.

While generally successful, there are problems with pressure injecting liquid crystal 14. First, the time required for the liquid crystal 14 to inject into the individual unit panels 1 is rather long. Generally, the gap between the driving device array substrate and the color filter substrate is very narrow, on the order of micrometers. Thus, only a very small amount of liquid crystal 14 is injected into per unit time. For example, it takes about 8 hours to inject liquid crystal 14 into an individual 15-inch unit panel 1. This decreases fabrication efficiency.

Second, liquid crystal 14 consumption is excessive. Only a small amount of liquid crystal 14 in the container 12 is actually injected into the individual unit panels 1. Since liquid crystal 14 exposed to air or to certain other gases can be contaminated by chemical reaction the remaining liquid crystal 14 should be discarded. This increases liquid crystal fabrication costs.

Therefore, an improved method and apparatus of disposing a liquid crystal between substrates would be beneficial.

SUMMARY OF THE INVENTION

Accordingly, the present invention is directed to provide a liquid crystal dispensing apparatus for directly dropping liquid crystal onto a glass substrate having at least one liquid crystal panel that substantially obviates one or more of the problems due to limitations and disadvantages of the related art.

Another advantage of the present invention is to provide a liquid crystal dispensing apparatus having a needle which is inserted into a liquid crystal container for opening/closing of a discharging hole of a needle sheet, with the needle being separable to enable repair of worn or damaged portions.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, there is provided a liquid crystal dispensing apparatus comprising: a liquid crystal container for holding liquid crystal; a case for receiving the liquid crystal container; a needle sheet disposed adjacent the liquid crystal container and having a discharging hole through which liquid crystal is discharged; a movable needle, comprised of separable first and second needle portions, that is inserted into the liquid crystal container and that can open and close the discharging hole; a spring that biases the needle toward the discharging hole; a solenoid and a bar magnetic adjacent the needle for producing a magnetic force that moves the needle to open the discharging hole; and a nozzle for dropping liquid crystal discharged through the discharging hole.

Beneficially, the first needle portion includes a protrusion and the second needle portion includes a recess. The protrusion and recess enable coupling of the first and second needle portions together. The needle beneficially further includes a coupling member that prevents the first and second needle portions from undesirably separating. That coupling member could be a split circular ring.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to the embodiments of the present invention, example of which are illustrated in the accompanying drawings.

To solve the problems of the conventional liquid crystal injection methods, a novel liquid crystal dropping method has been recently introduced. The liquid crystal dropping method forms a liquid crystal layer by directly applying liquid crystal onto a substrate and then spreading the applied liquid crystal by pressing substrates together. According to the liquid crystal dropping method, the liquid crystal is applied to the substrate in a short time period such that the liquid crystal layer can be formed quickly. In addition, liquid crystal consumption can be reduced due to the direct application of the liquid crystal, thereby reducing contamination problems and fabrication costs.

Figure 4:
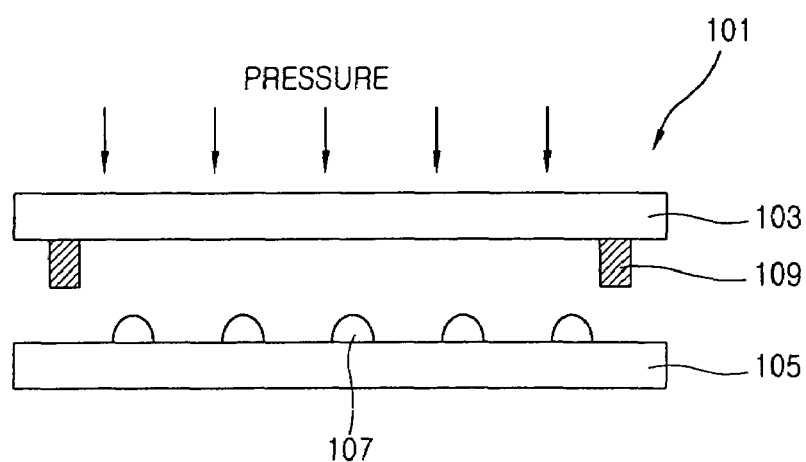
FIG. 4 is a view showing an exemplary LCD fabricated using a method for dropping liquid crystal according to the present invention.

FIG. 4 illustrates the basic liquid crystal dropping method. As shown, liquid crystal is dropped (applied) directly onto a lower substrate 105 before the lower substrate 105 and the upper substrate 103 are assembled. Alternatively, the liquid crystal 107 may be dropped onto the upper substrate 103. That is, the liquid crystal may be formed either on a TFT (thin film transistor) substrate or on a CF (color filter) substrate. However, the substrate on which the liquid crystal is applied should be the lower substrate during assembly.

A sealing material 109 is applied on an outer part of the upper substrate (substrate 103 in FIG. 4). The upper substrate (103) and the lower substrate (105) are then mated and pressed together. At this time the liquid crystal drops (107) spread out by the pressure, thereby forming a liquid crystal layer having uniform thickness between the upper substrate 103 and the lower substrate 105.

Figure 5:
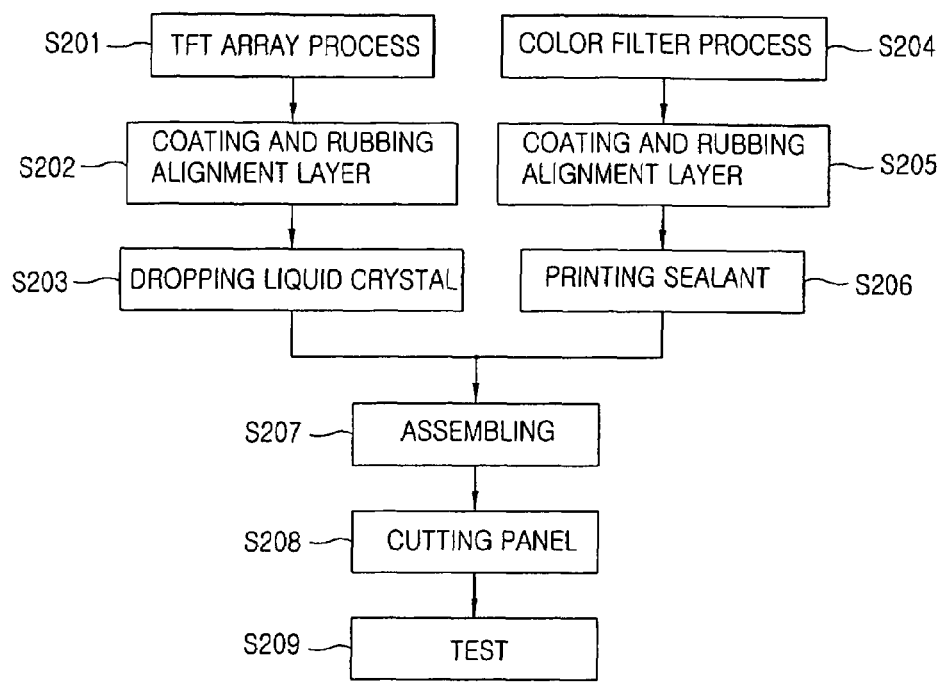
FIG. 5 is a flow chart showing an exemplary method for fabricating the LCD according to the liquid crystal dropping method.

FIG. 5 presents a flowchart of a method of fabricating LCDs using the liquid crystal dropping method. As shown, in steps S201 and S202 the TFT array is fabricated and processed, and an alignment layer is formed and rubbed. In steps S204 and S205 a color filter array is fabricated, and processed, and an alignment layer is formed and rubbed. Then, as shown in step S203 liquid crystal is dropped (applied) onto one of the substrates. In FIG. 5, the TFT array substrate is shown as receiving the drops, but the color filter substrate might be preferred in some applications. Additionally, as shown in step S206, a sealant is printed onto one of the substrates, in FIG. 5 the color filter substrate (the TFT array substrate might be preferred in some applications). It should be noted that the TFT array fabrication process and the color filter fabrication process are generally similar to those used in conventional LCD fabrication processes. By applying liquid crystals by dropping it directly onto a substrate it is possible to fabricate LCDs using large-area glass substrates (1000×1200 mm² or more), which is much larger than feasible using conventional fabrication methods.

Thereafter, the upper and lower substrates are disposed facing each other and pressed to attach to each other using the sealing material. This compression causes the dropped liquid crystal to evenly spread out on entire panel. This is performed in step S207. By this process, a plurality of unit liquid crystal panel areas having liquid crystal layers are formed by the assembled glass substrates. Then, in step S208 the glass substrates are processed and cut into a plurality of liquid crystal display unit panels. The resultant individual liquid crystal panels are then inspected, thereby finishing the LCD panel process, reference step S209.

Figure 1:
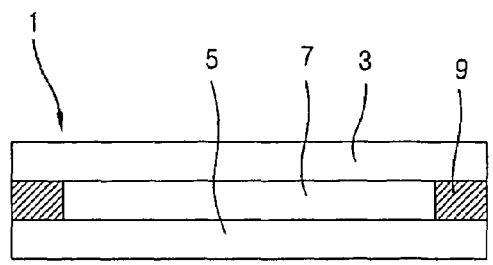
FIG. 1 is a cross-sectional view showing a general LCD.
Figure 2:
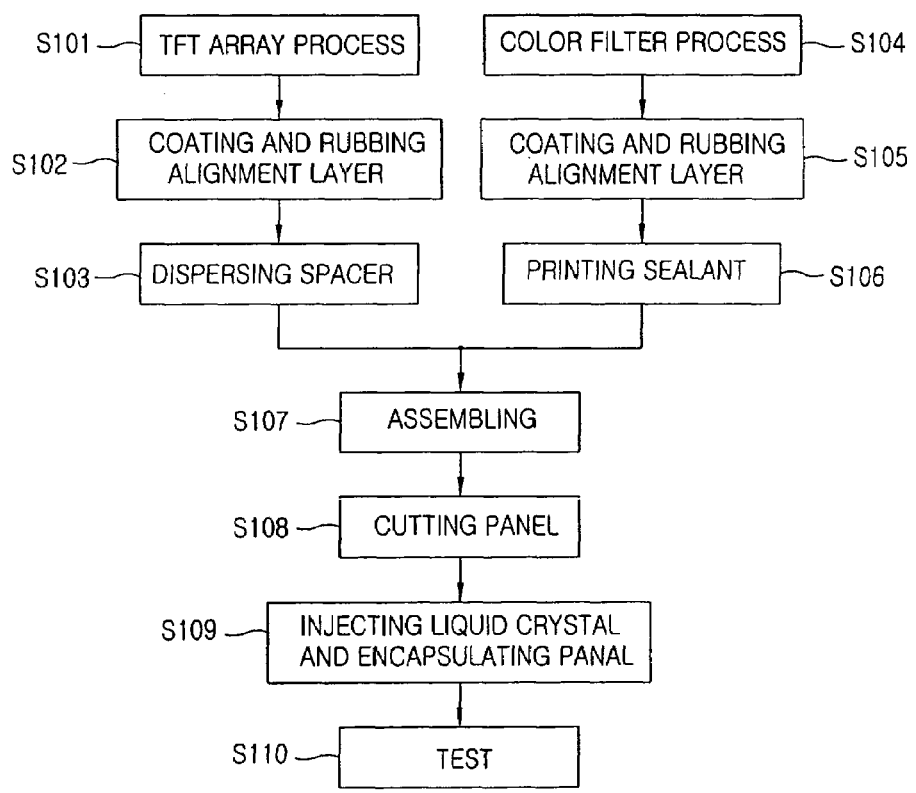
FIG. 2 is a flow chart showing a conventional method for fabricating the LCD.
Figure 3:
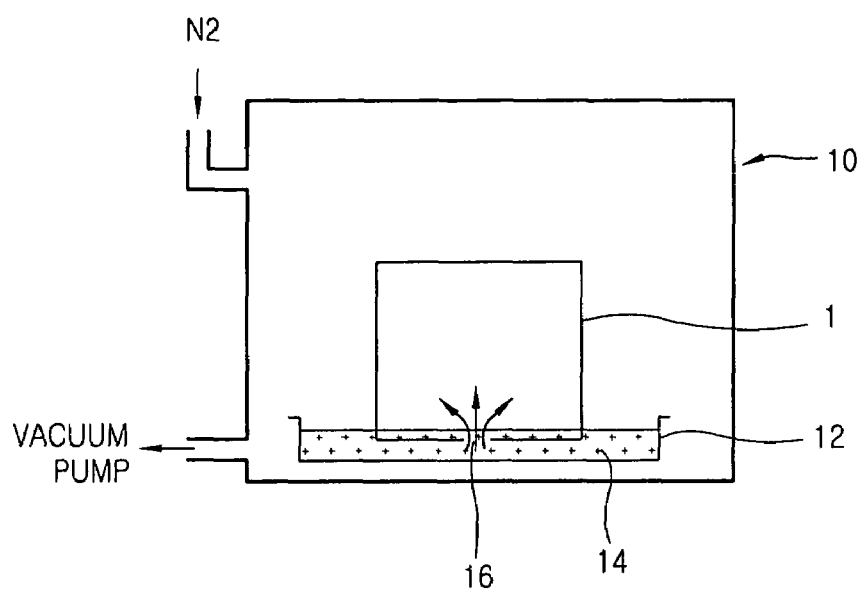
FIG. 3 is a view showing liquid crystal injection in the conventional method for fabricating the LCD.

The differences between the method shown in FIG. 5 and the method shown in FIG. 2 will be described as follows. Obvious differences include the difference between dropping and injecting liquid crystal, and the difference in the fabricating times, particularly with large area glass substrates. In addition, the liquid crystal injection method injects through a seal opening that then must sealed. However, in the liquid crystal dropping method the liquid crystal is dropped directly onto a substrate, and thus a seal opening is not needed. Moreover, in the liquid crystal injection method residual liquid crystal can be contaminated, while in the liquid crystal dropping method contamination is avoided. As the liquid crystal dropping method is simpler, the fabrication efficiency and yield can be improved.

Figure 6:
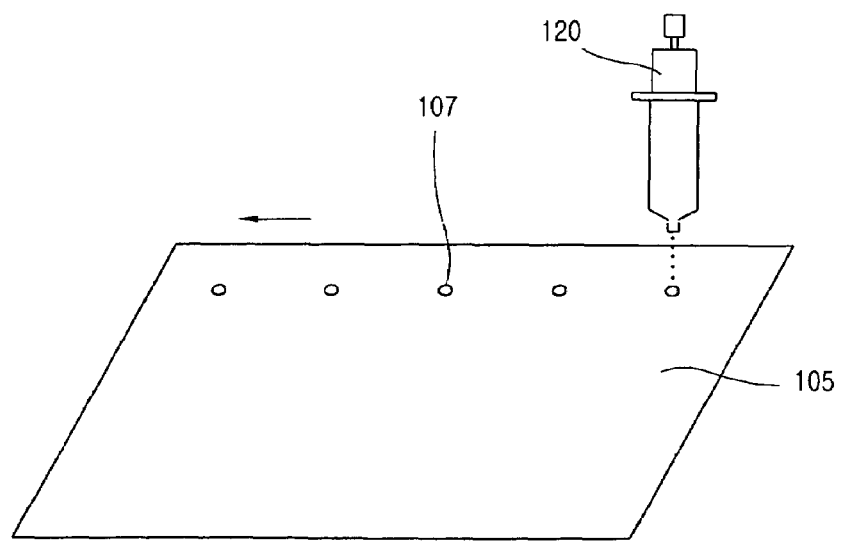
FIG. 6 is a view showing the basic concept of the liquid crystal dropping method.

In the liquid crystal dropping method, to form a liquid crystal layer having a desired thickness, the dropping position of the liquid crystal and the dropping amount of the liquid crystal should be carefully controlled. FIG. 6 illustrates dropping liquid crystal 107 onto a substrate 105 (beneficially a large glass substrate) using a liquid crystal dispensing device 120. As shown, the liquid crystal dispensing device 120 is installed above the substrate 105.

Generally, liquid crystal 107 is dropped onto the substrate 105 as well-defined drops. The substrate 105 preferably moves in the x and y-directions according to a predetermined pattern while the liquid crystal dispensing device 120 discharges liquid crystal at a predetermined rate. Therefore, liquid crystal 107 drops are arranged in a predetermined pattern such that the drops are separated by predetermined spaces. Alternatively, the substrate 105 could be fixed while the liquid crystal dispensing device 120 is moved. However, a liquid crystal drop could be trembled by the movement of the liquid crystal dispensing device 120. Such trembling could induce errors. Therefore, it is preferable that the liquid crystal dispensing device 120 is fixed and the substrate 105 is moved.

Figure 7A:
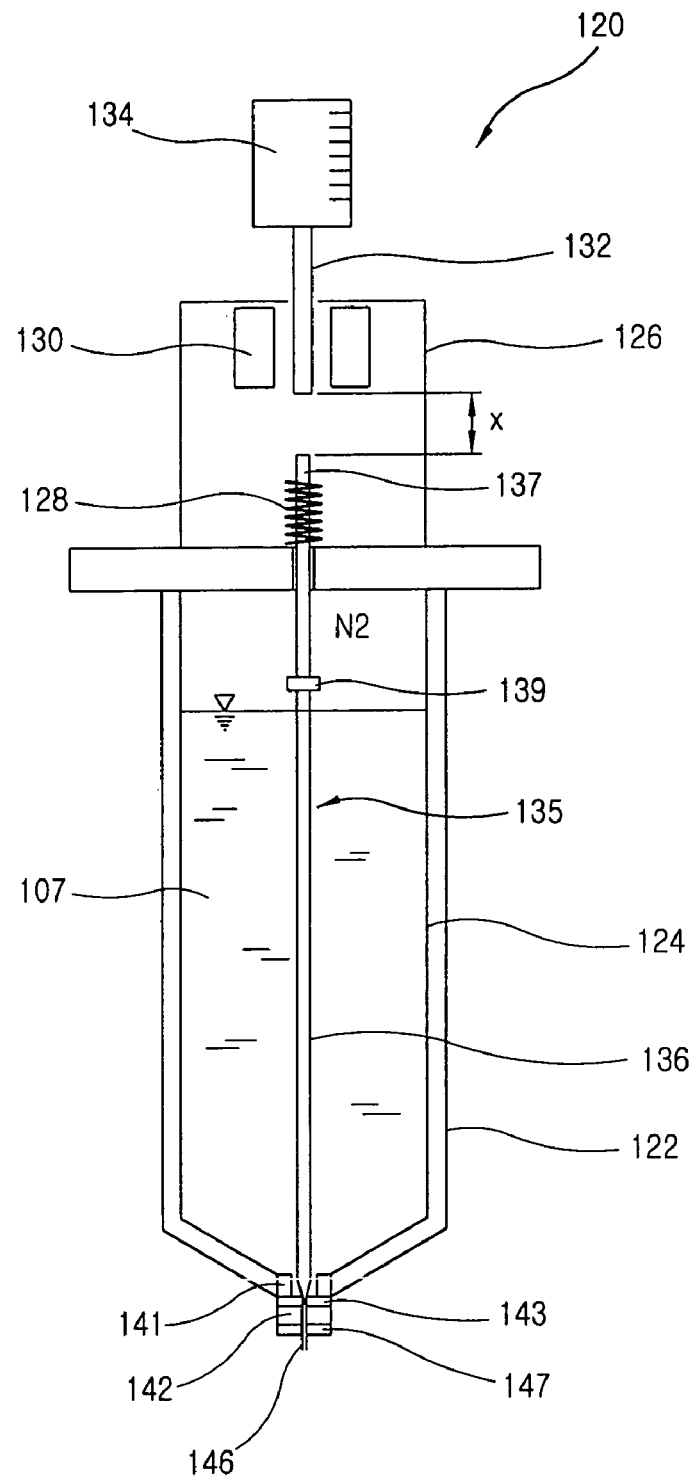
FIG. 7A illustrates a state in which liquid crystal is not dropped from a liquid crystal dropping apparatus.
Figure 7B:
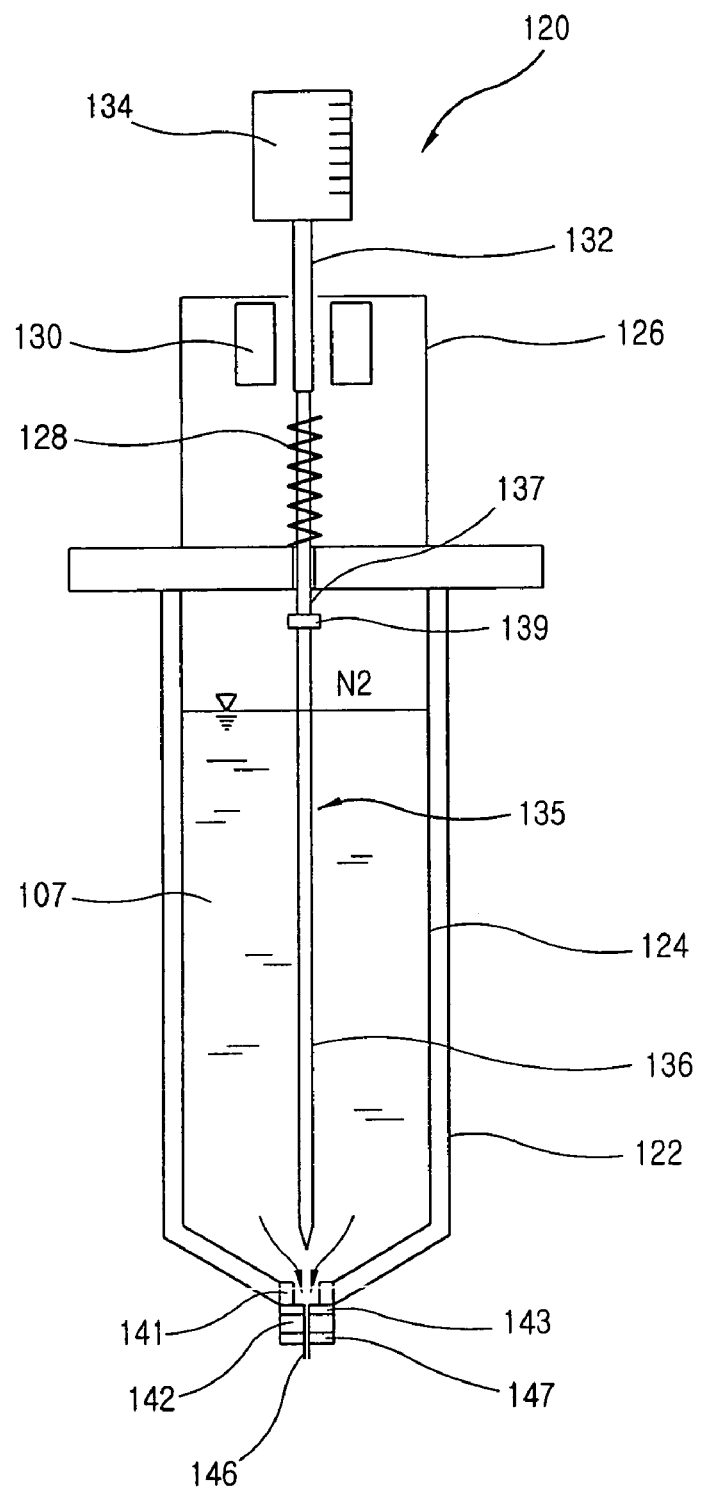
FIG. 7B illustrates a state in which liquid crystal is being dropped from a liquid crystal dropping apparatus.
Figure 8:
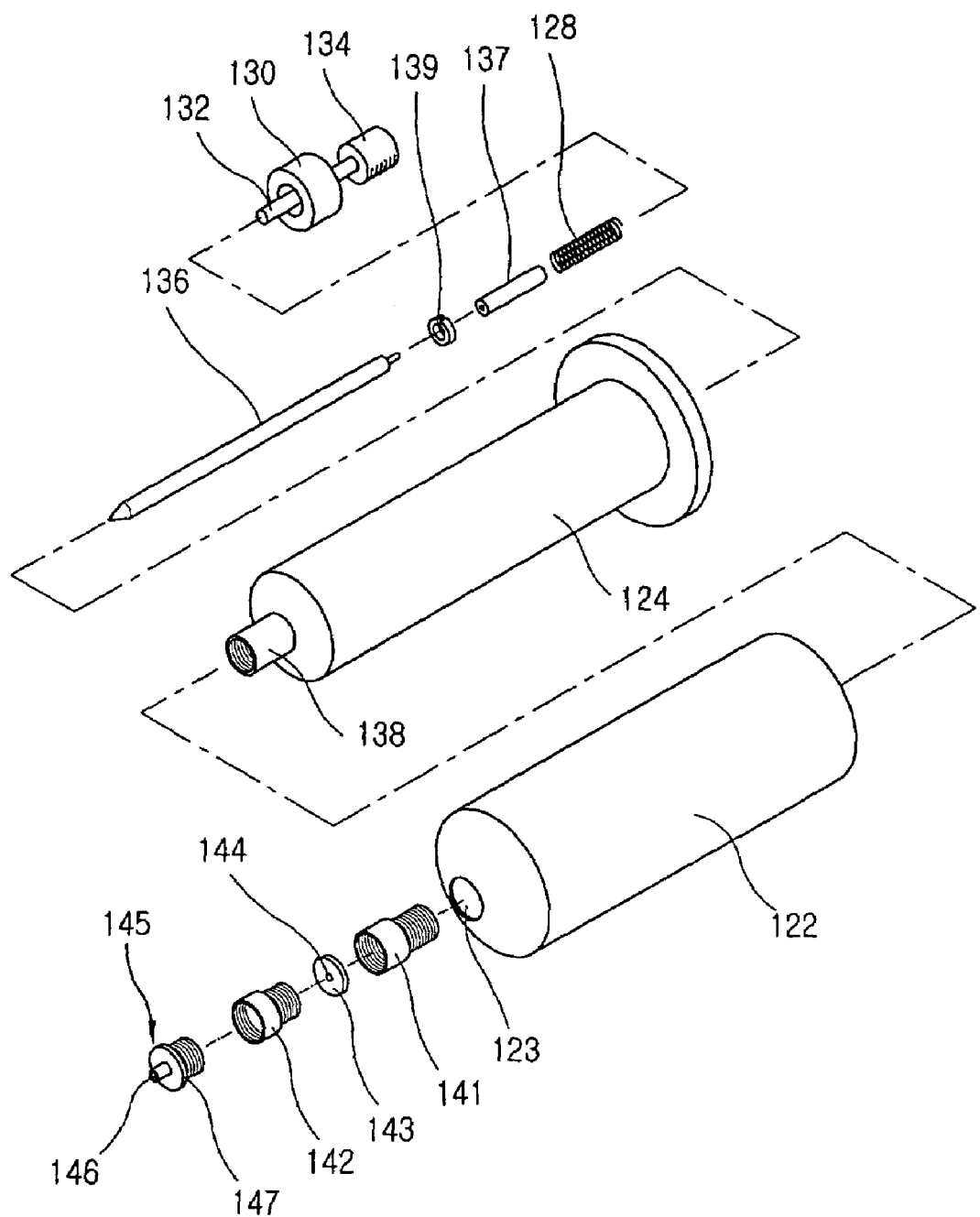
FIG. 8 is an exploded perspective view of FIG. 7A and 7B.

FIG. 7(a) illustrates the liquid crystal dispensing device 120 in a state in which liquid crystal is not being dropped. FIG. 7(b) illustrates the liquid crystal dispensing device 120 in a state in which liquid crystal is being dropped. FIG. 8 is an exploded perspective view of the liquid crystal dispensing device 120.

Referring now to FIGS. 7A, 7B, and 8, as shown, the liquid crystal dispensing device 120 includes a cylindrically shaped, polyethylene liquid crystal container 124 that is received in a stainless steel case 122. Generally, polyethylene has superior plasticity, it can be easily formed into a desired shape, and does not react with liquid crystal 107. However, polyethylene is structurally weak and is thus easily distorted. Indeed, if the case was of polyethylene it could be distorted enough that liquid crystal might not be dropped at the exact position. Therefore, a polyethylene liquid crystal container 124 is placed in a stainless steel case 122.

A gas supplying tube (not shown) that is connected to an external gas supplying (also not shown) is beneficially connected to an upper part of the liquid crystal chamber 124. A gas, such as nitrogen, is input through the gas supplying tube to fill the space without liquid crystal. The gas compresses the liquid crystal, thus tending to force liquid crystal from the liquid crystal dispensing device 120.

An opening 123 (see FIG. 8) is formed on a lower end portion of the case 122. A protrusion 138, formed on a lower end of the liquid crystal container 124, is inserted through the opening 123 to enable coupling of the liquid crystal container to the case 122. The protrusion 138 is coupled to a first connecting portion 141. As shown in FIG. 8, the protrusion 138 and the first connecting portion thread together.

The other end of the first connecting portion 141 is also threaded to enable mating with a second connecting portion 142. A needle sheet 143 having a discharging hole 144 is located between the first connecting portion 141 and the second connecting portion 142. Liquid crystal 107 in the liquid crystal container 124 is selectively discharged through the discharging hole 144 to the second connecting portions 142.

A nozzle 145 is connected to the second connecting portion 142. The nozzle 145 includes a discharging opening 146 for dropping liquid crystal 107 as small, well-defined drops. The nozzle 145 further comprises a supporting portion 147 that threads into the second connecting portion 142 to connect the nozzle 145 to the second connecting portion 142. A discharging tube that extends from the discharging hole 144 to the discharging opening 146 is thus formed. Generally, the discharging opening 146 of the nozzle 145 has a very small diameter in order to accurately control the liquid crystal drop.

A needle 135, comprised of a first needle portion 136 and a second needle portion 137, is inserted into the liquid crystal container 124. The first needle portion 136 contacts with the needle sheet 143. The end of the first needle portion 136 that contacts the needle sheet 143 is conically shaped to fit into the discharging hole 144 so as to close the discharging hole 144.

Figure 9:
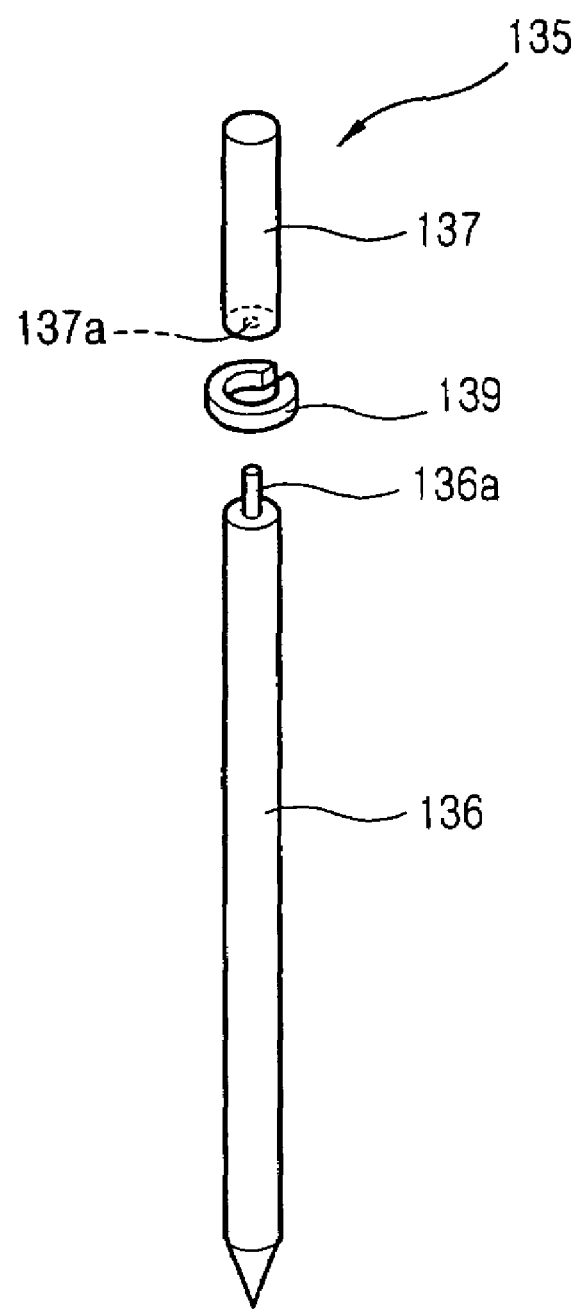
FIG. 9 is an exploded and enlarged view showing a needle.

The first needle portion 136 and the second needle portion 137 are constructed to be separable. As shown in FIG. 9, the first needle portion 136 includes a conical shaped end that contacts the needle sheet 143 and a threaded protrusion 136a on the other end. Also as shown in FIG. 9, one end of the second needle portion 137 has a threaded recess 137a that mates with the protrusion 136a. Disposed between the protrusion 136a and the recess 137a is a fixing coupler 139 that prevents the first needle portion 136 and the second needle 137 from undesirably separating. The fixing coupler 139 is beneficially a split lock washer.

In operation, the fixing coupler 139 is inserted onto the protrusion 136a, that protrusion is mated to the recess 137a, and the first and second needle portions are firmly threaded together.

The needle 135 is designed and constructed to be separated. The needle 135 is a very important component in the liquid crystal dispensing apparatus 120. In practice the first needle portion 136 and the needle sheet 143 form a set. If one is damaged, both are replaced. This is important because the up-and-down movement of the needle 135 to open and close the discharging hole 144 produces shocks. Moreover, the needle 135 is much thinner than it is long, which means the needle 135 is susceptible to distortion and other damage. Such damage may cause undesirable leakage from the discharging hole 144, meaning that liquid crystal may be dropped when it should not be dropped.

The principles of the present invention provide for a first needle portion 136 and a second needle portion 137 that can be separated. Thus, only the damaged portion needs to be replaced, which reduces replacement costs. This is particularly advantageous when the second needle portion 137 is damaged since the needle sheet 143 then does not have to be replaced (since the first needle portion 136 continues to be used). However, it should be understood that the second needle portion 137 should be magnetic.

While a specific separable needle 135 has been described, the principles of the present invention are not limited to that particular needle. For example, the first needle portion 136 and the second needle portion 137 can be coupled without the fixing coupler 139. Also, a bolt may be formed on the first needle portion 136 and a nut may be formed on the second needle portion 137.

Referring once more to FIGS. 7A, 7B, and 8, a spring 128 is disposed on an end of the second needle portion 131, which is located in an upper case 126. A magnetic bar 132 connected to a gap controlling unit 134 is positioned above the end of the second needle portion 137. The bar magnet 132 is made from a ferromagnetic material or from a soft magnetic material. A cylindrical solenoid 130 is positioned around the bar magnet 132. The solenoid 130 selectively receives electric power. That power produces a magnetic force that interacts with the bar magnet 132 to move the needle 135 against the spring 128, thus opening the discharging hole 144 of the needle sheet 143. This is why the second needle portion 137 should be magnetic. When the electric power is stopped, the needle 136 is returned to its static position by the elasticity of the spring 128, thus closing the discharge hole.

The end of the first needle portion 136 and the needle sheet 143 repeatedly contact each other. Accordingly, the end of the first needle portion 136 and the needle sheet 143 may be damaged by repeated shocks from repeated contact. Therefore, it is desirable that the end of the first needle portion 136 and the needle sheet 143 be formed using a material which is strong with respect to shock. For example, a hard metal, such as stainless steel may be used to prevent shock damage. As a result, the first needle portion 136 and the needle sheet 143 are beneficially comprised of stainless steel.

As shown in FIG. 7(b), when the discharging hole 144 of the needle sheet 143 is opened, the gas (nitrogen) supplied to the liquid crystal container 124 pressurizes the liquid crystal force liquid crystal 107 through the nozzle. It should be noted that the liquid crystal 107 drop size depends on the time that the discharge hole is open and on the gas pressure. The opening time is determined by the distance (x) between the second needle portion 137 and the magnetic bar 132, the magnetic force produced by the solenoid 130, and the tension of the spring 128. The magnetic force can be controlled by the number of windings that form the solenoid 130, or by the magnitude of the applied electric power. The distance x can be controlled by the gap controlling unit 134.

Also, although it is not shown in Figures, the solenoid 130 may be installed around the second needle portion 137. In that case, since the second needle portion 137 is made of a magnetic material, the second needle portion 137 is magnetized when electric power is applied to the solenoid 130. Thus needle 135 will rise to contact the magnetic bar 132.

As described above, the needle 135 is comprised of two needle portions that can be separated. Therefore, the needle 135 can be repaired, which reduces replacement cost if the needle becomes distorted or damaged. This is particularly advantageous if the second needle portion 137 becomes distorted or damaged since only the second needle portion 137 must be replaced. This avoids the need to replace the needle sheet 137.

As described above, according to the present invention, there is provided a liquid crystal dispensing apparatus including a needle which can be separated and coupled, and therefore, the needle can be replace easily at lower price when the needle is distorted or damaged. The liquid crystal dispensing apparatus of the present invention is not limited to a specified liquid crystal dispensing apparatus, but can be applied to all apparatuses used for dropping liquid crystal.

It will be apparent to those skilled in the art that various modifications and variations can be made in the liquid crystal dispensing apparatus of the present invention without departing from the spirit or scope of the invention. Thus, it is intended that the present invention cover the modifications and variations of this invention provided they come within the scope of the appended claims and their equivalents.

What is claimed is:

1. A liquid crystal dispensing apparatus, comprising:
    a liquid crystal container for holding liquid crystal;
    a needle sheet disposed near an end of the liquid crystal container and having a discharging hole for discharging liquid crystal; and
    a needle structure including a plurality of separately combined needles, the needles being detachably combined to each other at their end portions, the needle structure being inserted into the liquid crystal container, the needle structure contacting the discharging hole to open and close the discharging hole.

2. The apparatus of claim 1, further comprising a spring for biasing the needle structure toward the discharging hole.

3. The apparatus of claim 1, further comprising a needle mover for selectively moving the needle in response to applied power.

4. The apparatus of claim 3, wherein the needle mover includes a solenoid that attracts the needle structure.

5. The apparatus of claim 4, wherein the needle mover further includes a bar magnet that assists the solenoid to attract the needle structure.

6. The apparatus of claim 4, wherein a portion of the needle structure to be contacted to the solenoid is formed of a magnetic material.

7. The apparatus of claim 1, further comprising a nozzle disposed near an end of the liquid crystal container for dropping liquid crystal onto a substrate.

8. The apparatus of claim 7, further comprising a coupler that couples the liquid crystal container to the nozzle.

9. The apparatus of claim 1, further comprising a combining structure for combining the plurality of separate needles.

10. The apparatus of claim 9, wherein the combining structure includes a protrusion formed at an end portion of one separate needle and a recess formed at an end portion of another separate needle, wherein the protrusion and recess mate to combine the separate needles.

11. The apparatus of claim 10, wherein the combining structure includes a circular ring for maintaining the mating of the protrusion and the recess.

12. The apparatus of claim 11, wherein the circular ring maintains the mating of the protrusion and the recess using elasticity.

13. A dispensing apparatus, comprising:
a container containing dispensing material;
a nozzle in fluid communication with an interior of the container via a discharge hole; and
a needle structure within the container containing the dispensing material so that the outer surface of the needle structure is contacted with the dispensing material, the needle structure including:
a first needle portion; and
a second needle portion detachably connected to a terminal end of the first needle portion,
wherein the first and second portions are moveable within the container to open and close the discharge hole and the first and second portion is solid.

14. The dispensing apparatus of claim 13, wherein
the first needle portion includes first and second terminal ends and a protrusion at the first terminal end; and
the second needle portion includes third and fourth terminal ends and a recess at the third terminal end, the recess being configured to receive the protrusion.

15. The dispensing apparatus of claim 14, wherein the first terminal end is configured for receipt by the discharging hole.

16. The dispensing apparatus of claim 14, wherein the protrusion is threaded.

17. The dispensing apparatus of claim 14, wherein the recess is threaded.

18. The dispensing apparatus of claim 14, further comprising a split-lock washer between the second and third terminal ends.

19. The dispensing apparatus of claim 13, further comprising a spring for biasing the needle structure toward the discharge hole, wherein the spring is adjacent to the second needle portion.

20. The dispensing apparatus of claim 13, further comprising a solenoid biasing the needle structure away from the discharge hole and a magnet operably proximate between the solenoid and a terminal end of the second needle portion.

* * * * *